Jan. 21, 1936. T. L. BOWERS 2,028,133

HAND TRUCK

Filed Sept. 12, 1934 2 Sheets-Sheet 1

INVENTOR
TOWNES L. BOWERS
BY

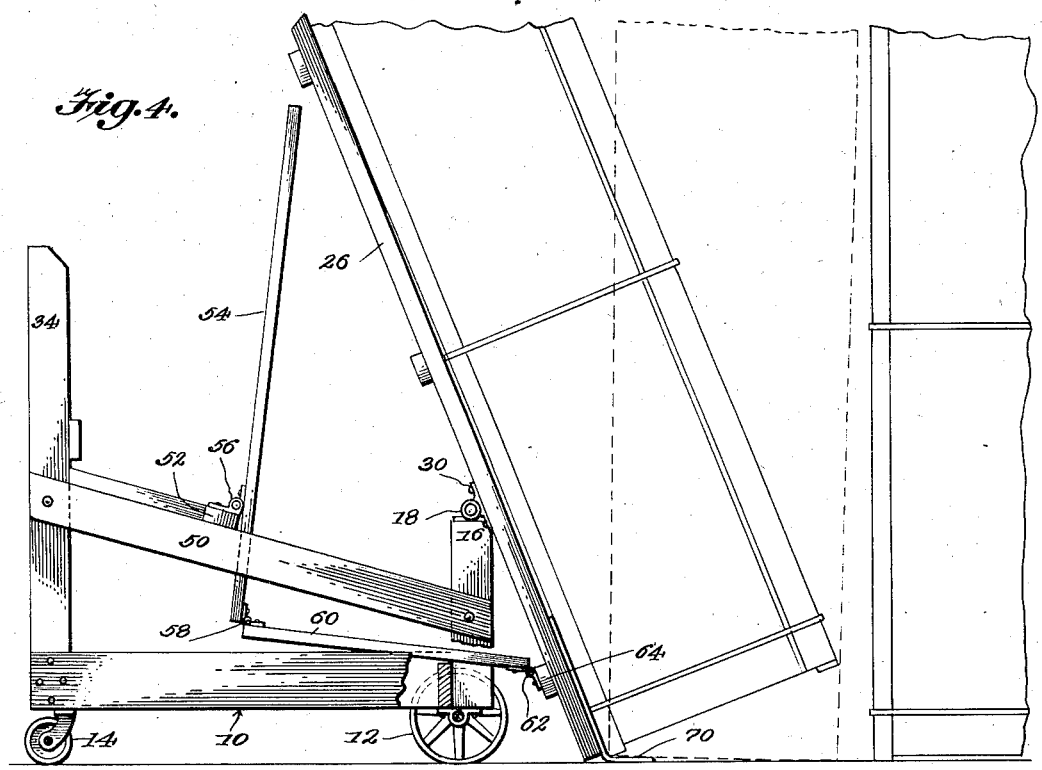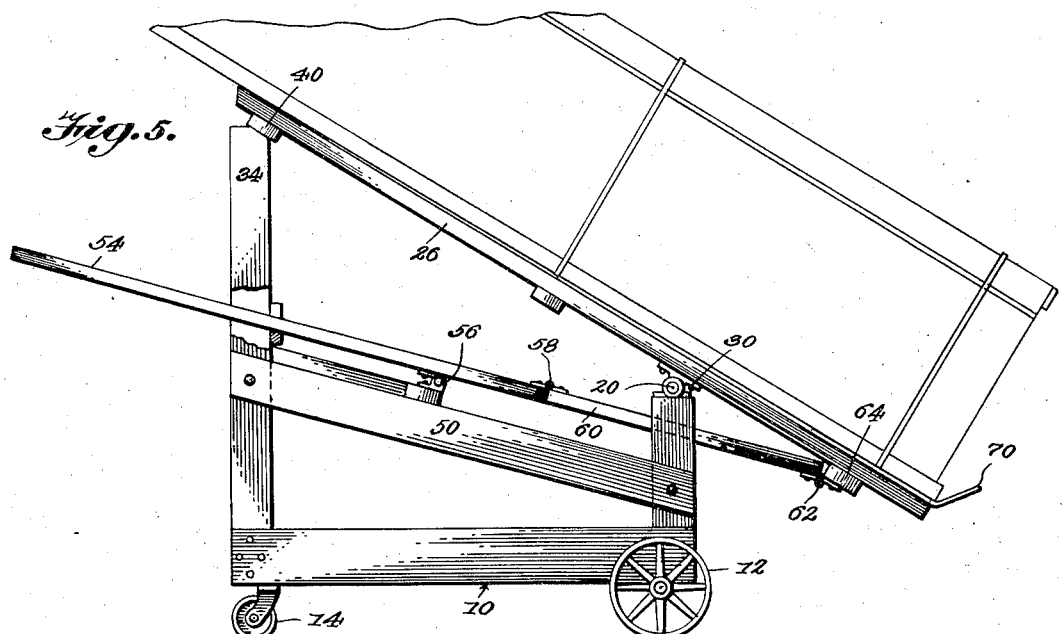

Patented Jan. 21, 1936

2,028,133

UNITED STATES PATENT OFFICE 2,028,133

HAND TRUCK

Townes Leigh Bowers, Waco, Tex.

Application September 12, 1934, Serial No. 743,770

3 Claims. (Cl. 254—3)

This invention relates to hand trucks for use in handling such cumbersome and weighty objects as burial vaults.

Under present conditions, burial vaults are moved about in warehouses and other places on two-wheel trucks of conventional design and by reason of the great weight and bulk of such vaults and the unusual strength required in handling a vault laden truck, there have been cases in which the truck and its load have gotten beyond control and caused serious injury to the operator.

With an appreciation of the foregoing and other considerations peculiar to handling large and weighty objects with the aid of hand trucks, the invention forming the subject of this application will be found to contemplate a truck in which the operator is afforded positive protection against injury and in which the operator is relieved of the necessity of employing great strength to load or unload the truck or to maintain the load in a balanced state while being moved from place to place.

A further aim is to provide a truck of the character suggested which may be handled with ease, and one that is rigid in construction and relatively cheap to manufacture.

Other objects and advantages will be apparent during the course of the following description.

Figure 1:
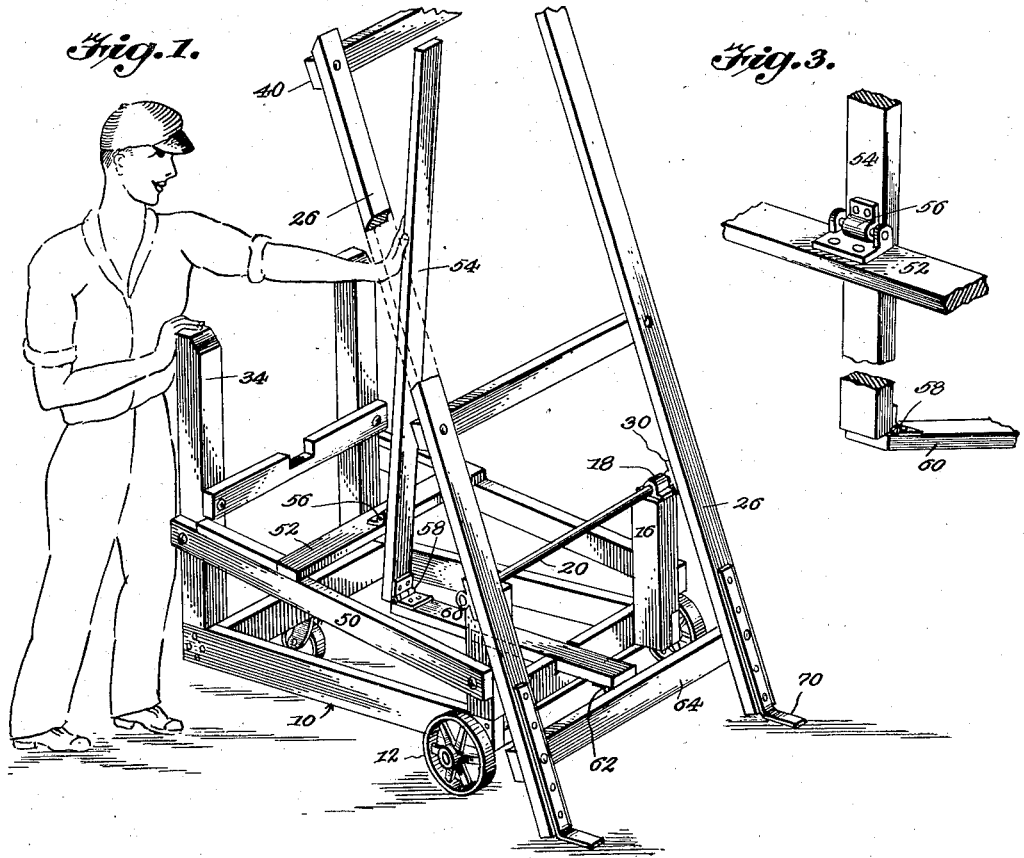
Figure 3:
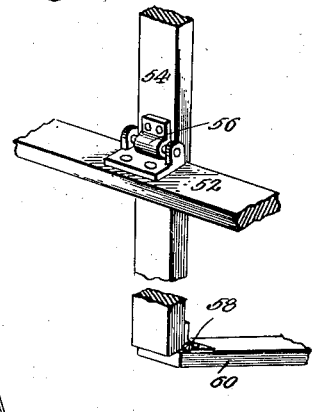
Figure 2:
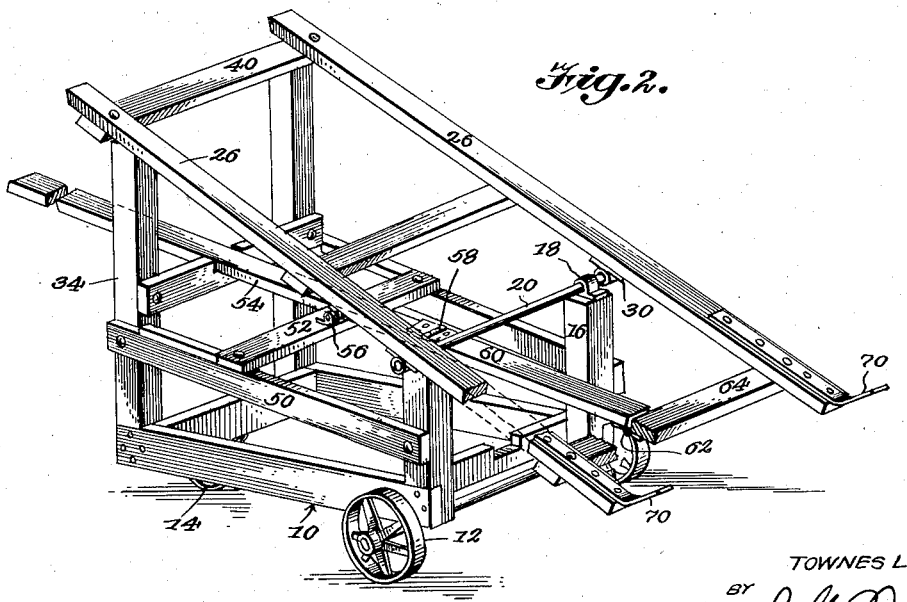

In the accompanying drawings forming a part of this application and in which like numerals are employed to designate like parts throughout the same, Figure 1 is a perspective of the improved truck in position either to load or unload, Figure 2 is a perspective of the truck in position for transporting its load, Figure 3 is a fragmentary perspective illustrating the pivotal mounting of a lever by which the platform or bed of the truck is swung from one extreme position to another, Figure 4 is a side elevation of the truck in position to load or unload, and Figure 5 is a fragmentary side elevation of the truck with the parts thereof in position for transporting a load.

In the drawing, wherein for the purpose of illustration is shown a preferred embodiment of the invention, the numeral 10 generally designates a frame, possibly in the form of a rectangle and having the forward portion thereof provided with wheels or rollers 12 while the rear or controlling end of the frame is preferably provided with a single swiveled caster 14 providing a means by which the truck may be moved from place to place and turned within a very short radius. This permits the truck to be handled in restricted spaces and especially adapts the invention for use in places where space is a major consideration.

As illustrated in Figure 1, the forward end of the frame 10 is provided with upstanding corner posts or standards 16 having the upper portions thereof provided with bearings 18 for the rotatable mounting of an attaching bar 20.

It is clearly illustrated in Figure 1 that a bed or platform 26, possibly of rectangular outline, is provided at a point between the midway line thereof and the lower extremity thereof with bearings 30 mounted upon the attaching bar 20 and thus horizontally pivoting the bed to the frame. In other words, the platform or bed 26 is horizontally and transversely hinged at a point between the median line thereof and the lower end thereof to the forward end of the mobile frame so that the bed or platform may be swung from the loading and unloading position shown in Figure 1 to the object carrying position shown in Figure 2.

Now, by special reference to Figure 2 it will be seen that the rear or controlling end of the frame 10 is provided with corner posts or standards 34 extending substantial distances above the upper ends of the forward standards 16 and disposed in the path of arcuate movement of the bed 26 so as to positively limit the rearward swinging movement of the platform and thus afford protection to the operator.

At the same time, the standards 34, extending as they do above the height of the corner posts 16, constitute a rest for the bed 26 during the transportation of the object being carried. This is clearly illustrated in Figure 5. From this figure, it will be seen that the bed or platform 26 is provided at a point adjacent the rear portion thereof with a cross-beam or connecting bar 40 adapted for engagement with the beveled forward corners of the posts 34 so that the weight of one end portion of the vault or other object being carried is distributed more or less uniformly to the pair of posts 34.

Coming now to the means by which the bed 26 is swung from one extreme position to another, attention is invited to Figure 2 in which it is illustrated that the mobile frame 10 is provided with a pair of longitudinal side rails 50 joined intermediate the ends thereof by a transversely extending beam or bar 52. It is clearly illustrated that the cross-beam 52 constitutes a support for a longitudinally extending control lever 54. The lever 54 is horizontally hinged or pivoted as indicated at 56 to the intermediate portion of the cross-beam 52 and is of a length to extend a sufficient distance rearward of the main body of the frame to form a handle located for convenient manual engagement.

The forward portion of the actuating lever 54 is horizontally hinged or pivoted as indicated at 58 to the rear portion of a rigid one-piece link 60. The forward portion of the link 60 is, in turn, horizontally hinged as indicated at 62 to a cross-beam 64 carried by the underside of the bed 26 at a point adjacent to the forward end thereof.

The lever arrangement provides a simple and safe means by which the operator standing at a position behind the truck, may swing the bed 26 and its load from one extreme position to another without danger of injury to himself.

In explaining this, it is pointed out that when it is desired to load the truck with a burial vault or other weighty and bulky object, it is simply necessary to tilt the bed 26 to the position illustrated in Figure 4 and to bring the feet 70 of the bed into lifting engagement with the object. When this has been done the object, such as a burial vault, is swung over to the full line position disclosed in Figure 4, after which the operator has only to reach through the unobstructed space between the corner posts 34 and draw rearwardly on the otherwise free end of the lever 54.

The rearward swinging of the lever has the effect of exerting a powerful forward movement on the link 60 which, in turn, rocks the bed or platform 26 rearward so that it will come to rest upon the front and rear corner posts 16 and 34, respectively.

With the platform 26 thus resting upon the posts 16 and 34, the truck may be moved with its load and by reason of the wheeled mounting of the frame, the turning radius of the truck is very small so that the same may be used to advantage in relatively small spaces.

During the movement of the truck and its load from place to place, the operator is not required to balance the load as is the case in the use of conventional hand trucks and it is, by reason of the presence of the posts 34 and associated parts, impossible for the load to fall upon or injure the operator, who occupies a position safely at the rear of the truck.

In unloading the truck, the operator may remain in his position safely at the rear thereof and raise the otherwise free end of the lever 54 so as to swing the bed or platform 26 to the position shown in Figure 4. By reason of the relatively low height of the posts 16 and the off-center pivotal mounting of the bed 26, there is brought about an easy and steady movement of the platform from one position to another, during which movement the operator remains in full control, at no time being in danger of an overbalancing which might allow the object being carried to fall upon him.

It will be seen that when the bed 26 is in either of its extreme positions, it holds the lever 54 against accidental swinging movement.

The invention forming the subject of this application is not in any manner restricted to use in connection with burial vaults and by the same token it is to be understood that the form of invention herewith shown and described is to be taken merely as a preferred example of the same and that such changes in arrangement and construction of parts may be made as will remain within the spirit of the invention and the scope of what is claimed.

Having thus described the invention, what is claimed is:

1. In a truck for moving bulky and heavy objects, a mobile frame having pairs of front and rear corner posts, a platform horizontally hinged to the front corner posts, said rear corner posts being extended substantial distances above the height of the front corner posts and being located in the path of travel of said platform to form a rest for the platform, a combined platform actuating and control lever hinged adjacent the forward end thereof to said frame and having a handle portion extending between the rear corner posts and terminating beyond the same, a rigid one-piece link connected to the forward portion of said lever and to the forward portion of said platform, the connection between said link and said platform being between the hinge mounting of said platform and the forward end of the platform.

2. In a truck for moving bulky and weighty objects, a mobile frame having a lifting end and a controlling end, a platform horizontally hinged to the lifting end of said frame at a point adjacent the forward end of the platform, said frame being provided at the controlling end thereof with rigid means extending to a height substantially above the height of the lifting end of said frame and being located in the arc of movement of the platform to form a rest therefor, a combined platform actuating and control lever horizontally hinged at a point adjacent the forward end thereof to said frame and having a handle portion extending beyond the controlling end of the frame and adapted for manual engagement, and a link connected to the forward portion of said lever and to the platform adjacent the forward end thereof and at a point in advance of the hinge mounting of the platform.

3. In a truck for moving bulky and weighty objects, a mobile frame having a lifting end and a controlling end, said frame being provided at the lifting end thereof with a post, a platform horizontally hinged to said post at a point adjacent the forward end of the platform, said frame being provided at the controlling end thereof with a post of rigid form and extending to a height substantially above the height of the first-named post and being located in the arc of movement of the platform to form a rest therefor, said frame also being provided with a cross-beam at a point between the ends thereof, a combined platform actuating and control lever extending centrally and longitudinally through the frame and horizontally hinged to said cross-beam and having a handle portion extending beyond the second-named post and the controlling end of the frame and adapted for manual engagement, and a link connected to said lever and to the platform adjacent the forward end of the platform and at a point in advance of the first-named post, the said connection between the lever and the platform forming a means by which the platform holds the lever against independent movement.

TOWNES LEIGH BOWERS.